US011509040B2

(12) United States Patent
Ha et al.

(10) Patent No.: US 11,509,040 B2
(45) Date of Patent: *Nov. 22, 2022

(54) MOBILE TERMINAL

(71) Applicant: LG ELECTRONICS INC., Seoul (KR)

(72) Inventors: Jihun Ha, Seoul (KR); Yeomin Youn, Seoul (KR); Byungwoon Jung, Seoul (KR); Chisang You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

This patent is subject to a terminal disclaimer.

(21) Appl. No.: 17/236,636

(22) Filed: Apr. 21, 2021

(65) Prior Publication Data

US 2021/0242571 A1 Aug. 5, 2021

Related U.S. Application Data

(63) Continuation of application No. 16/737,839, filed on Jan. 8, 2020, now Pat. No. 11,043,734, which is a
(Continued)

(30) Foreign Application Priority Data

Nov. 27, 2015 (KR) ........................ 10-2015-0167904

(51) Int. Cl.
*H01Q 1/24* (2006.01)
*H01Q 21/28* (2006.01)
(Continued)

(52) U.S. Cl.
CPC ............... *H01Q 1/243* (2013.01); *H01Q 1/24* (2013.01); *H01Q 1/48* (2013.01); *H01Q 5/35* (2015.01);
(Continued)

(58) Field of Classification Search
CPC .................................. H01Q 1/243; H01Q 9/04
(Continued)

(56) References Cited

U.S. PATENT DOCUMENTS 6,466,176 B1 10/2002 Maoz et al.
9,407,739 B2 8/2016 Chen et al.
(Continued)

FOREIGN PATENT DOCUMENTS

CN 104577334 4/2015
KR 1020120097877 9/2012
(Continued)

OTHER PUBLICATIONS

U.S. Appl. No. 16/236,080, Office Action dated May 17, 2019, 25 pages.
(Continued)

*Primary Examiner* — Kiet M Doan
(74) *Attorney, Agent, or Firm* — Lee, Hong, Degerman, Kang & Waimey PC

(57) ABSTRACT

The present invention relates to a mobile terminal comprising: a terminal body; a ground provided in the interior of the terminal body; a first conductive member distanced from the ground, electrically supplied from a first supply unit, and surrounding one side of the ground; a second conductive member disposed on one side of the first conductive member, electrically supplied from a second supply unit, and surrounding the other side of the ground; and a junction portion, disposed at one point on the first conductive member, for grounding same to the ground, wherein one end of the first conductive member is distanced from the ground to form a first open slot, one end of the second conductive member is distanced from one end of the first conductive member to form a second open slot, the other ends are
(Continued)

connected to the ground, and the first and second conductive members are oriented so as to cross each other.

10 Claims, 15 Drawing Sheets

Related U.S. Application Data continuation of application No. 16/236,080, filed on Dec. 28, 2018, now Pat. No. 10,553,931, which is a continuation of application No. 15/779,492, filed as application No. PCT/KR2016/008703 on Aug. 8, 2016, now Pat. No. 10,205,225.

(51) Int. Cl.
| | | |
|---|---|---|
| *H01Q 9/42* | (2006.01) | |
| *H01Q 13/10* | (2006.01) | |
| *H01Q 5/35* | (2015.01) | |
| *H01Q 9/04* | (2006.01) | |
| *H04M 1/02* | (2006.01) | |
| *H01Q 1/48* | (2006.01) | |

(52) U.S. Cl.
CPC ............... *H01Q 9/04* (2013.01); *H01Q 9/42* (2013.01); *H01Q 13/10* (2013.01); *H01Q 21/28* (2013.01); *H04M 1/02* (2013.01); *H04M 1/0266* (2013.01); *H04M 1/0274* (2013.01); *H04M 1/0277* (2013.01)

(58) Field of Classification Search
USPC ............... 343/702, 713; 455/575.1, 90.3
See application file for complete search history.

(56) References Cited

U.S. PATENT DOCUMENTS

| | | | |
|---|---|---|---|
| 9,484,631 B1* | 11/2016 | Napoles | ............... H01Q 5/378 |
| 2008/0062045 A1 | 3/2008 | Dinallo et al. | |
| 2008/0198082 A1 | 8/2008 | Soler Castany et al. | |
| 2012/0268339 A1 | 10/2012 | Qi et al. | |
| 2012/0302298 A1 | 11/2012 | Ayatollahi | |
| 2012/0313827 A1 | 12/2012 | Kim et al. | |
| 2013/0093640 A1 | 4/2013 | Kwon et al. | |
| 2013/0135157 A1 | 5/2013 | Tsou et al. | |
| 2013/0194138 A1 | 8/2013 | Hammond | |
| 2014/0078008 A1 | 3/2014 | Kang et al. | |
| 2014/0243052 A1 | 8/2014 | Hobson et al. | |
| 2014/0333495 A1 | 11/2014 | Vazquez et al. | |
| 2015/0138024 A1 | 5/2015 | Kalistaja et al. | |
| 2015/0147984 A1* | 5/2015 | Ying | ............... H04B 1/3827 455/90.3 |
| 2015/0155614 A1 | 6/2015 | Youn et al. | |
| 2017/0346164 A1 | 11/2017 | Kim et al. | |
| 2018/0261907 A1 | 9/2018 | Ha et al. | |
| 2019/0157745 A1 | 5/2019 | Ha et al. | |
| 2020/0153087 A1 | 5/2020 | Ha et al. | |

FOREIGN PATENT DOCUMENTS

| | | |
|---|---|---|
| KR | 1020130006797 | 1/2013 |
| KR | 1020130048610 | 5/2013 |
| KR | 1020130053934 | 5/2013 |
| KR | 1020140037687 | 3/2014 |
| KR | 1020150064566 | 6/2015 |

OTHER PUBLICATIONS

U.S. Appl. No. 16/737,839, Notice of Allowance dated Mar. 4, 2021, 12 pages.
PCT International Application No. PCT/KR2016/008703, Written Opinion of the International Searching Authority dated Nov. 22, 2016, 9 pages.
Korean Intellectual Property Office Application No. 10-2015-0167904, Office Action dated Dec. 5, 2016, 5 pages.
Korean Intellectual Property Office Application No. 10-2015-0167904, Notice of Allowance dated Nov. 3, 2017, 6 pages.
European Patent Office Application Serial No. 16868766.3, Search Report dated Jun. 27, 2019, 9 pages.

* cited by examiner

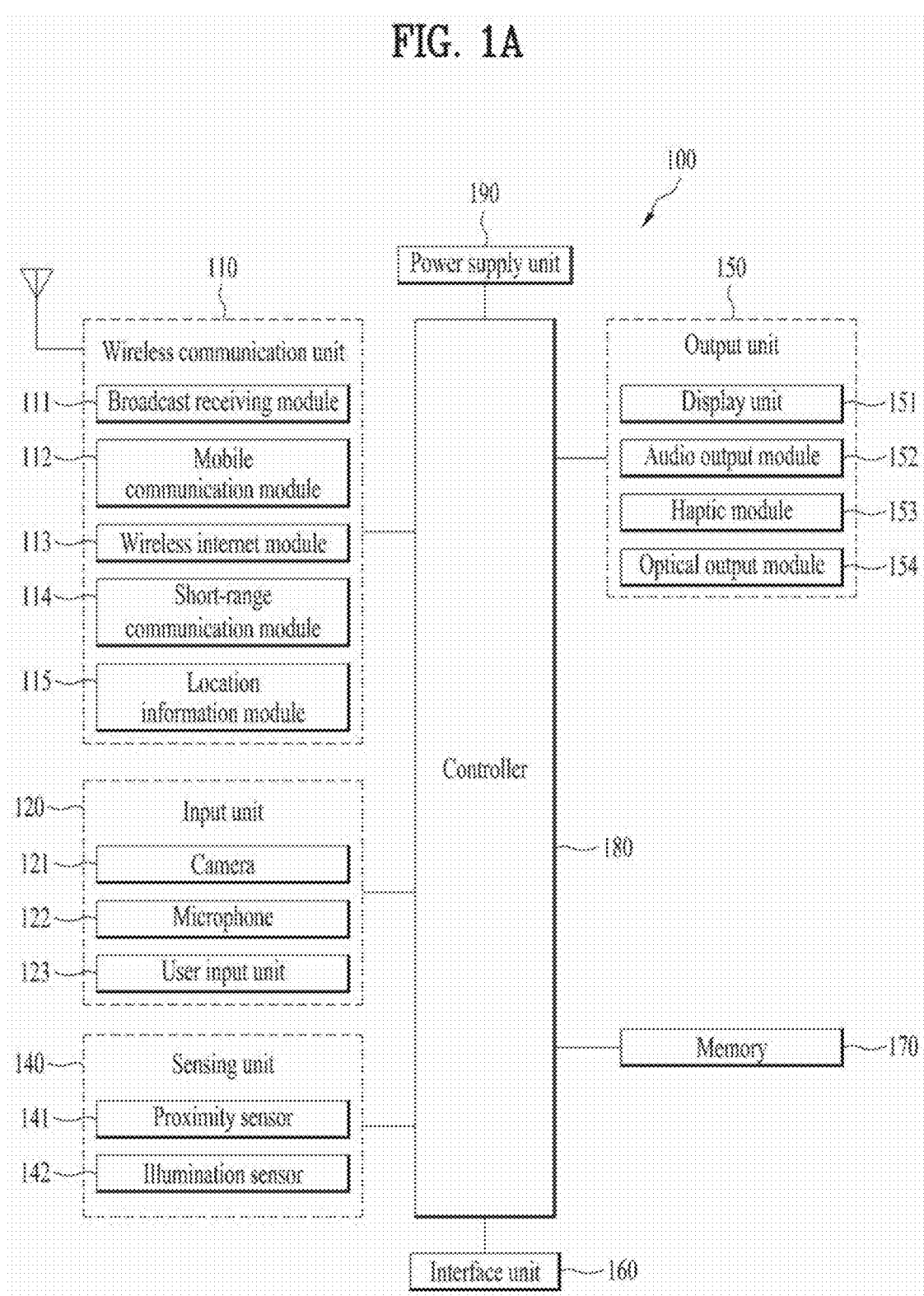

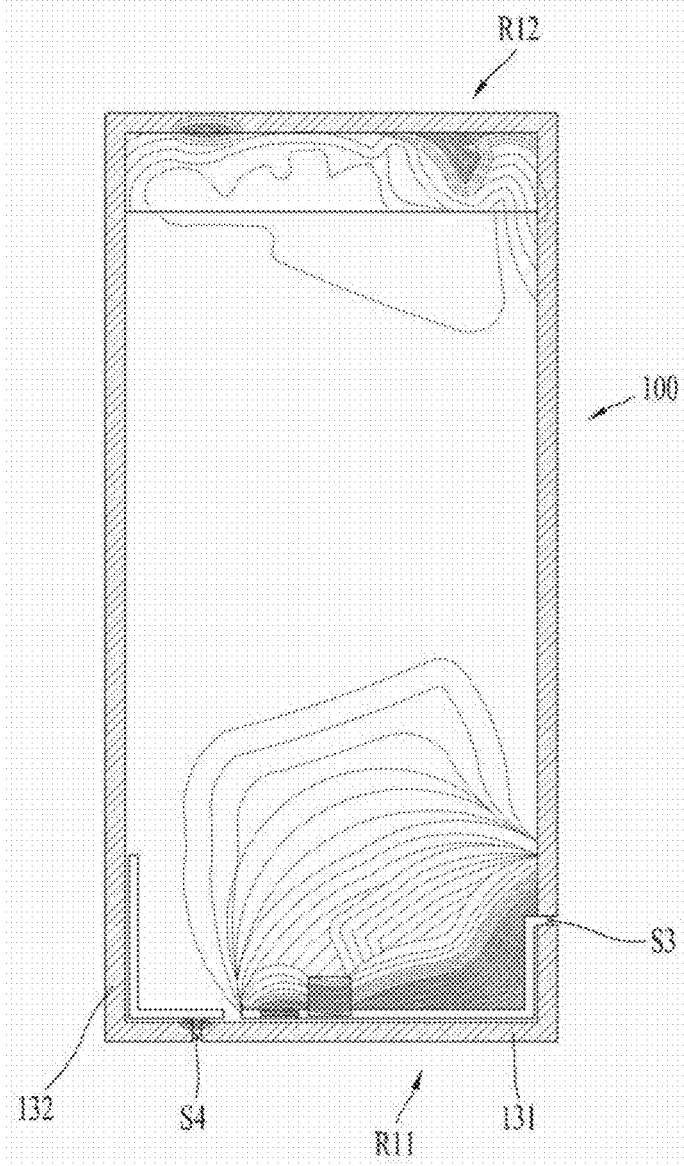

MOBILE TERMINAL

CROSS-REFERENCE TO RELATED APPLICATIONS

This application is a continuation of U.S. patent application Ser. No. 16/737,839, filed on Jan. 8, 2020, which is a continuation of U.S. patent application Ser. No. 16/236,080, filed on Dec. 28, 2018, now U.S. Pat. No. 10,553,931, which is a continuation of U.S. patent application Ser. No. 15/779,492, filed on May 25, 2018, now U.S. Pat. No. 10,205,225, which is the National Stage filing under 35 U.S.C. 371 of International Application No. PCT/KR2016/008703, filed on Aug. 8, 2016, which claims the benefit of earlier filing date and right of priority to Korean Application No. 10-2015-0167904, filed on Nov. 27, 2015, the contents of which are all hereby incorporated by reference herein in their entirety.

TECHNICAL FIELD

The present invention relates to a mobile terminal having an antenna.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

A mobile terminal is provided with a multitude of antennas such as PIFA (planar inverted F0type antenna), slot antenna and the like.

In order to secure a multitude of frequency bands, it is necessary to secure a sufficient antenna radiation space. However, in order to secure a radiation space of an antenna sufficiently, a bezels needs to be widened or a separate antenna pattern is required.

SUMMARY OF THE INVENTION

Accordingly, an object of the present invention is to address the above-noted and other problems. Another object of the present invention is to provide a mobile terminal, by which an antenna can be formed so as to prevent distributions of electric fields from interfering with each other using at least one slot.

In one technical aspect of the present invention, provided herein is a mobile terminal, including a terminal body, a ground provided within the terminal body, a first conductive member spaced apart from the ground, the first conductive member fed by a first feeder unit, the first conductive member enclosing one side of the ground, a second conductive member formed on one side of the first conductive member, the second conductive member fed by a second feeder unit, the second conductive member enclosing the other side of the ground, and a junction portion formed at a prescribed point of the first conductive member so as to ground the first conductive member to the ground, wherein one end portion of the first conductive member forms a first open slot by being spaced apart from the ground, wherein one end portion of the second conductive member forms a second open slot by being spaced apart from the one end portion of the first conductive member and the other end portion is connected to the ground, and wherein the first and second conductive members are formed in directions crossing with each other, respectively.

According to one aspect of the present invention, at least one of the first and second open slots may be formed near a corner of the terminal body.

According to one aspect of the present invention, the first conductive member may include a first submember formed along a first direction and a second submember formed along a second direction crossing with the first direction, and a length of the first submember may be greater than that of the second submember.

According to one aspect of the present invention, the second conductive member may include a third submember formed along the first direction and a fourth submember formed along the second direction, and the third submember may be shorter than the fourth submember.

According to one aspect of the present invention, the mobile terminal may further include a third feeder unit formed at an opposite location of the first feeder unit centering on the junction portion in the first conductive member so as to feed the first conductive member.

According to one aspect of the present invention, a feeder extension portion may be provided to at least one of the first to third feeder units.

According to one aspect of the present invention, the first conductive member, the second conductive member, the first to third feeder units, and the junction portion may be provided to at least one of a top end and a bottom end of the terminal body.

According to one aspect of the present invention, each of the first and second conductive members may include a metallic member exposed externally by enclosing a side of the terminal body.

According to one aspect of the present invention, the terminal body may include a front case having a display unit provided thereto, a rear case joined to the front case by being formed on a rear side of the front case, a metal frame provided between the front case and the rear case, and a printed circuit board provided to one side of the metal frame, and the ground may include at least one of the metal frame and the printed circuit board.

According to one aspect of the present invention, a switch connected to the printed circuit board may be provided to at least one of the first and second conductive members.

According to one aspect of the present invention, the feeder extension unit may be provided to one side of the rear case by extending from the first or second conductive member.

According to one aspect of the present invention, the mobile terminal may further include a rear cover formed of metallic material covering a rear side of the rear case, and the rear cover may include a nonmetallic member.

According to one aspect of the present invention, the rear case may include a main surface portion covering the printed circuit board and a side portion formed in a thickness direction of the terminal body so as to form an internal space with the front case and the rear case may further include a multitude of contact pins connecting the side portion to the ground.

According to one aspect of the present invention, the terminal body may include a case for receiving the display unit therein, and a nonmetallic member may be provided between the case and the metallic member.

According to one aspect of the present invention, the junction portion and the feeder extension portion may extend from the printed circuit board to a backside of the display unit.

According to one aspect of the present invention, the mobile terminal may further include a metal frame provided between the display unit and the case and a printed circuit board provided to one side of the metal frame, and the ground may include at least one of the metal frame, the printed circuit board and the case.

According to one aspect of the present invention, the mobile terminal may further include a multitude of contact pins connecting the case to the ground.

According to one aspect of the present invention, the second open slot may include a slot for an earjack.

A mobile terminal according to the present invention provides the following effects and/or features.

According to at least one of embodiments of the present invention, by improving ground radiation, a radiation space of an antenna can be advantageously secured.

According to at least one of embodiments of the present invention, a side portion of a mobile terminal can be advantageously utilized as a radiator of an antenna.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 1A is a block diagram of a mobile terminal in accordance with the present disclosure.

FIG. 8 schematically shows a radiation pattern by a first conductive member according to a first embodiment of the present invention for a mobile terminal overall.

BEST MODE FOR INVENTION

Figure 1B:
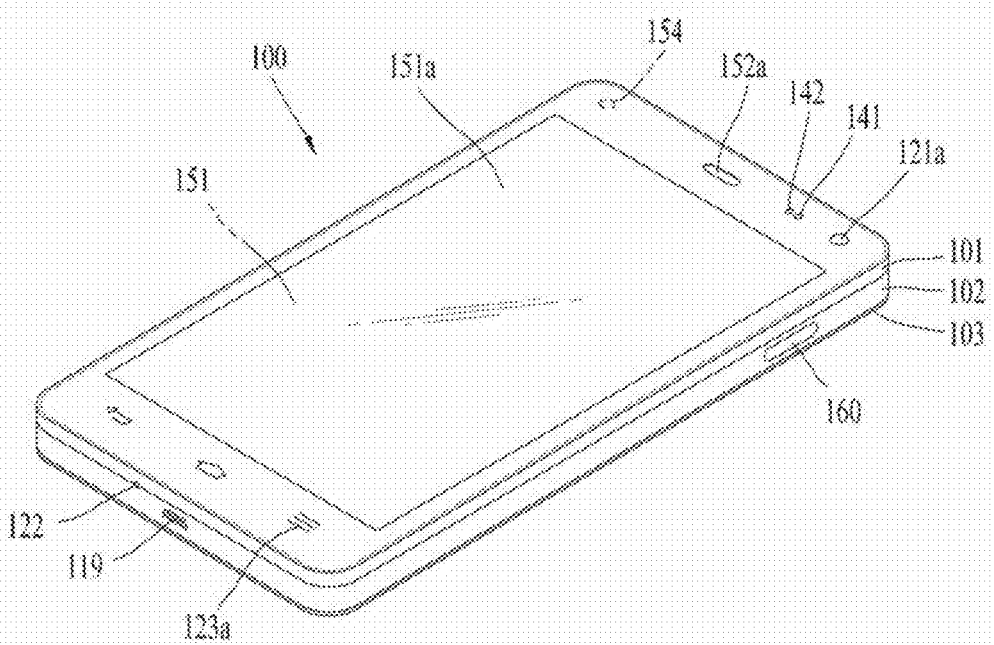
FIGS. 1B and 1C are conceptual views of one example of the mobile terminal, viewed from different directions.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1C:
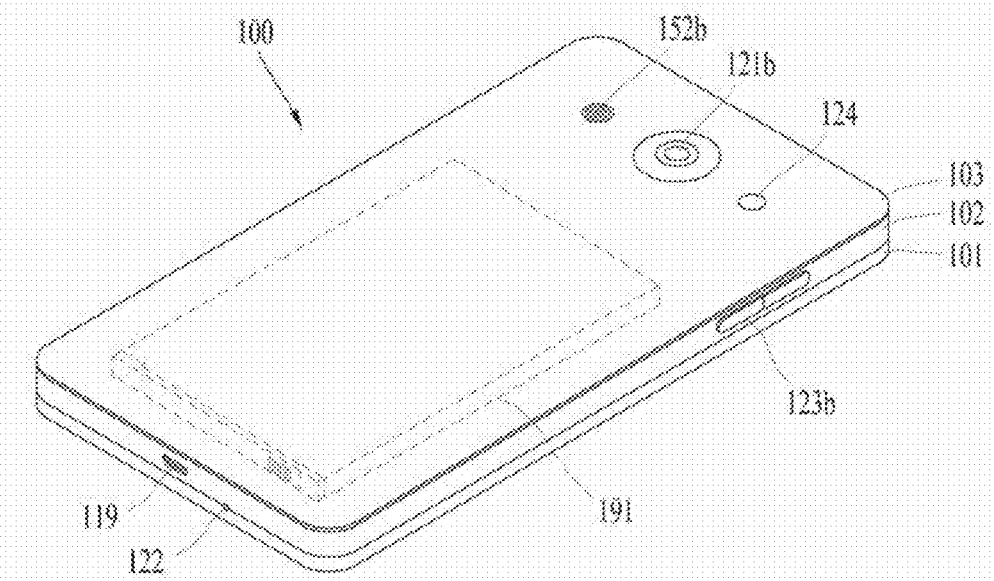

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in The FIG. 1A is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Hereinafter, referring to FIG. 1, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the audio output module, the proximity sensor 141, the illuminance sensor 142, the optical output module 154, the camera 121, the user input unit 123, the microphone 122 and the interface unit 160.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A). may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2A:
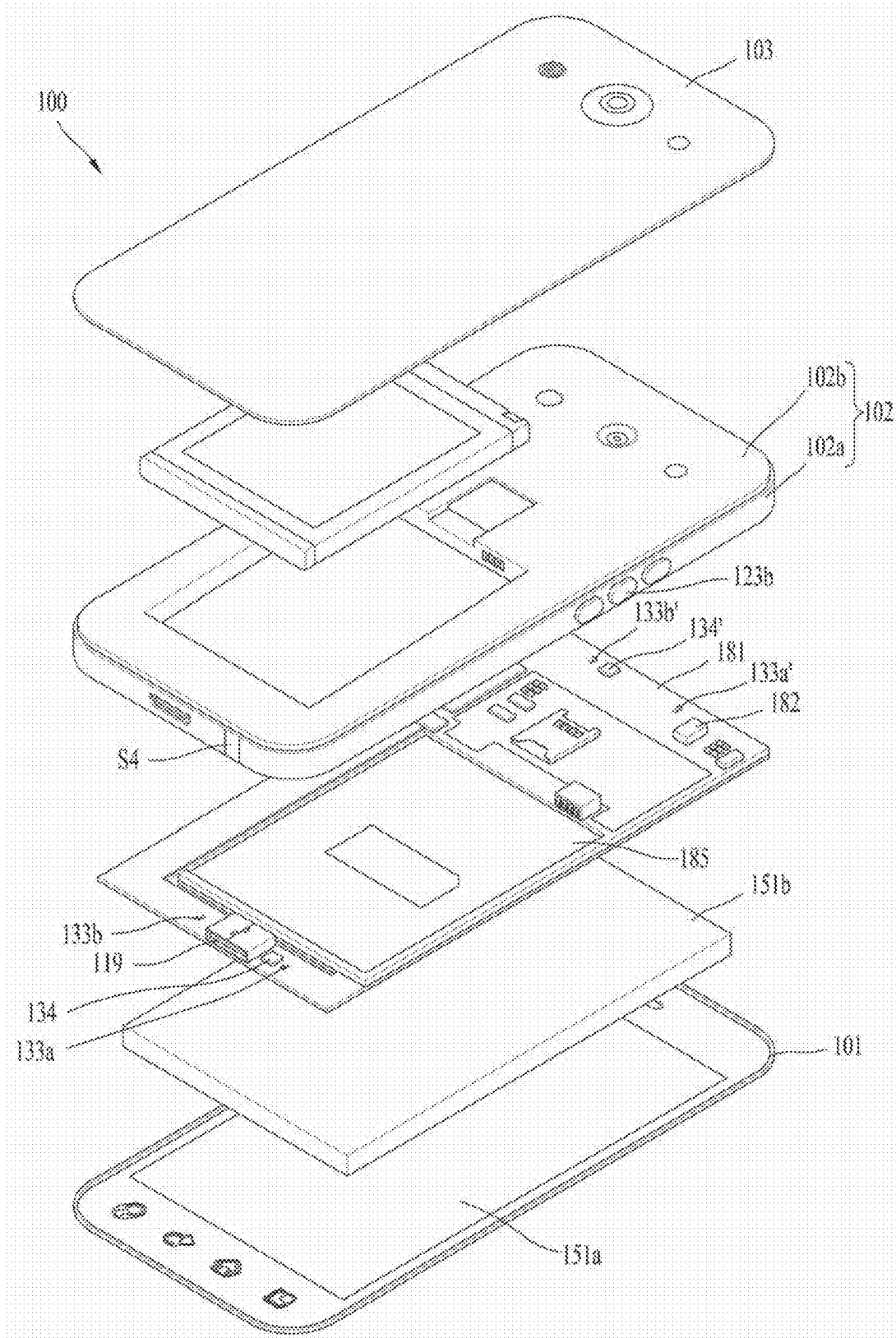
FIG. 2A is an exploded perspective diagram of a mobile terminal according to a first embodiment of the present invention.
Figure 2B:
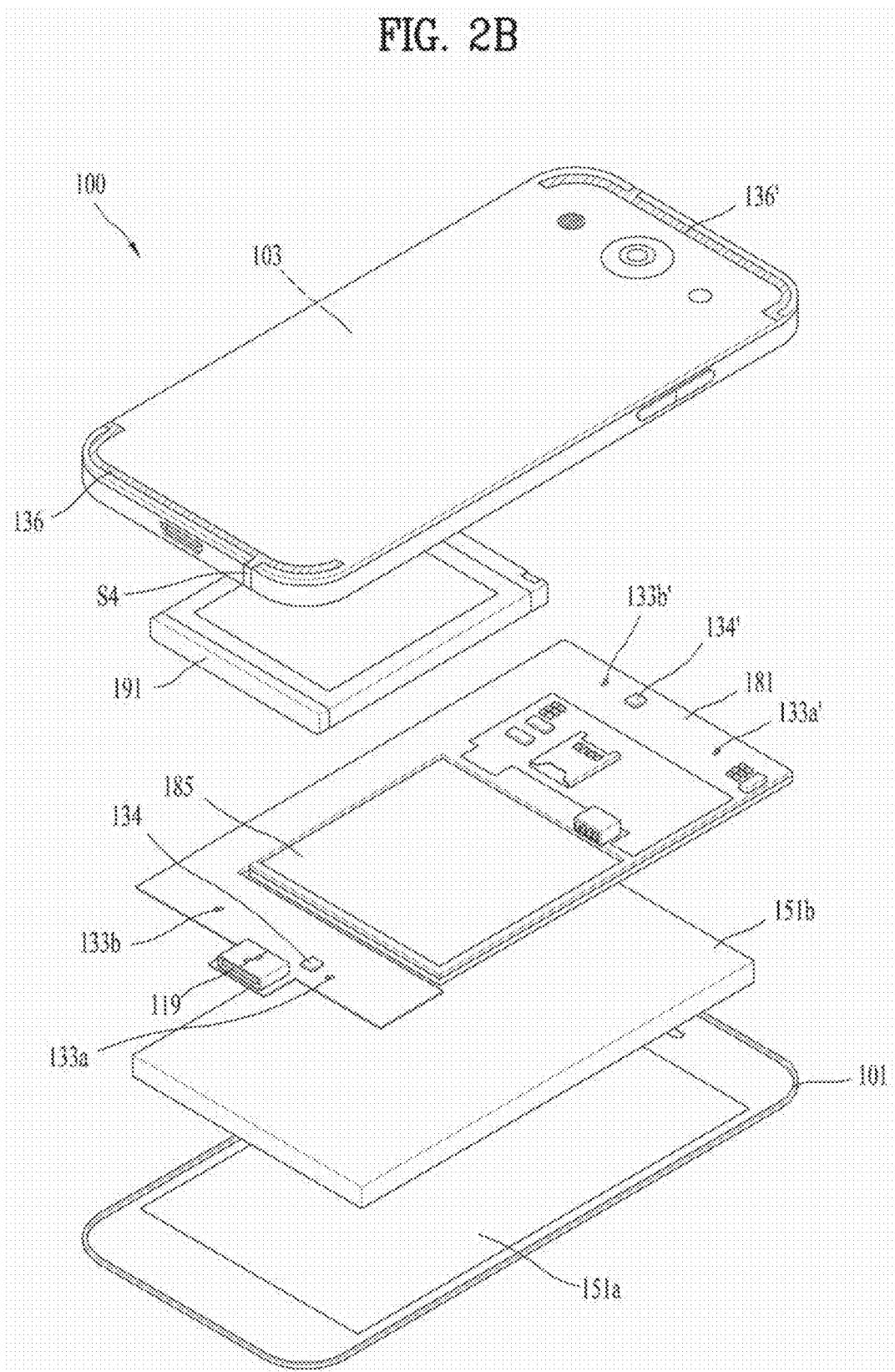
FIG. 2B is an exploded perspective diagram of a mobile terminal according to a second embodiment of the present invention.

FIG. 2A is an exploded perspective diagram of a mobile terminal 100 according to a first embodiment of the present invention, and FIG. 2B is an exploded perspective diagram of a mobile terminal 200 according to a second embodiment of the present invention. FIG. 2A can be understood as an exploded perspective diagram of FIG. 1C. FIG. 2B can be understood as a case of being configured with the display unit 151 and a single case having the display unit 151 received therein, which can be categorized as a uni-body type terminal.

In FIG. 2A, shown is a mobile terminal 100 including a front case 101 receiving a window 151a, a display module 151b provided under the window 151a, a printed circuit board 181 provided under the display module 151b, a rear case 102 joined to the front case 101, the rear case 102 forming an internal space with the front case 101 so as to receive electronic pars 182 (cf. FIG. 2A) therein, and a rear cover 103 covering a rear side of the rear case 102 to form a rear exterior of the mobile terminal 100. Here, the rear case 102 includes a main surface portion 102b covering the printed circuit board 181 and a side portion 102a formed in a thickness direction of the mobile terminal 100 so as to form an internal space with the front case 101.

In this case, the side portion 102a may be formed of metallic material and the main surface portion 102b may be formed of plastic material, by which the present invention is non-limited.

Meanwhile, in FIG. 2B, shown is a mobile terminal 100 of a uni-body type that forms a single case in a manner that the rear case 102 and the rear cover 103 are integrally formed. Although FIG. 2B exemplarily shows that the window 151a are formed in the front case 101, by which the present invention is non-limited. Instead, as the window 151a and the display module 151b are integrally formed without the front case 101, a hybrid LCD (not shown) is formed. And, the hybrid LCD may be joined to the case of the uni-body type. Yet, the description with reference to FIG. 2B shall be made on the assumption that the case 103 for receiving the window 151a therein corresponds to the rear case 102 and the rear cover 103 integrally formed together in FIG. 2A.

Here, in FIG. 2A, a part corresponding to the main surface portion 102b and the side portion 102a are formed of metallic material. Or, the side portion 102b is formed of metallic material but the main surface portion 102b is formed of nonmetallic material. In FIG. 2B, the case 103 may be formed of metallic material. In such a case, a part configuring the side portion 102a of the rear case 102 may operate as an antenna, or a portion of the case 103 in FIG. 2B may operate as an antenna.

One embodiment of the present invention relates to a technique of utilizing a part configuring a body of the mobile terminal 100, and more particularly, a side part, e.g., the side portion 102a as an antenna.

Particularly, disclosed is the technique of utilizing a side part spaced apart from a component, which performs a function of a ground inside the mobile terminal 100, in a predetermined distance as an antenna. Here, since the part forming the side part of the mobile terminal 100 forms an exterior of the terminal body, it may be named a decoration member. Namely, according to one embodiment of the present invention, an antenna is boosted to enable radiation to occur from a ground, and a technique for a boosting slot antenna is disclosed.

In the mobile terminal 100, an antenna device is mostly provided to a top or bottom side of the terminal body. An antenna implemented in one embodiment of the present invention is illustrated as provided to the top side and/or the bottom side of the terminal body. The following description shall be made based on such configuration.

For example, FIG. 2A shows that a frame 185 is disposed between the rear case 102 and the circuit board 181 and that a display module 151b is joined to one side of the circuit board 181. The rear cover 103 can be joined to the rear case 102 so as to cover a battery 191. Here, the frame 185 is a part for improving rigidity of the mobile terminal 100.

A touch sensor (not shown) may be installed in the window 151a. The touch sensor is configured to sense a touch input and formed light-transmissive. The touch sensor may be installed on a front side of the window 151a and configured to convert a variation of a voltage or the like generated from a specific point of the widow 151a into an electrical input signal.

The display module 151b is mounted on a rear side of the window 151a. According to the present embodiment, as an example of the display module 151b, a thin film transistor-liquid crystal display (TFT-LCD) is disclosed, by which the present invention is non-limited.

For example, the display module 151b may include a liquid crystal display (LCD), an organic light-emitting diode (OLED), a flexible display, a 3D display, etc.

The circuit board 181 may be installed under the display module 151b. And, at least one electronic element 182 may be installed on a bottom side of the circuit board 181.

A receiving part in a recessed shape may be formed in the frame 185 so as to receive the battery 191 therein. A contact terminal connected to the circuit board 181 may be formed at one lateral side of the rear case 102 or the frame 185 so as to supply power to a terminal body.

An antenna module may be provided to a top or bottom end of the mobile terminal 100.

Generally, LTE/WCDMA Rx only antenna, GPS antenna, BT/WiFi antenna and the like may be provided to the top end of the mobile terminal 100, and a main antenna may be formed provided to a bottom end of the mobile terminal 100.

According to one embodiment of the present invention, a frequency band of at least one of the LTE/WCDMA Rx only antenna, the GPS antenna, and the BT/WiFi antenna may be transmitted/received according to a frequency band.

Moreover, a plurality of antenna modules are formed and disposed on end portions of the terminal, respectively. And, the antenna modules can be configured to transceive radio signals of different frequency bands, respectively.

The frame 185 may be formed of metallic material to maintain sufficient rigidity despite being formed thin. The frame 185 of the metallic material can operate as a ground. Namely, the circuit board 191 or conductive members 131 and 132 for antennas can be grounded to the frame 185, and the frame 185 can operate as a ground of the circuit board 181 or the antenna. In this case, the frame 185 can extend the ground of the mobile terminal 100. Moreover, according to a second embodiment of the present invention, as shown in FIG. 2B, the rear cover 193 can extend a ground region of the antenna.

In this case, if the circuit board 181 is configured to occupy most of an area of the terminal body without having the frame 185, the circuit board 181 may extend a ground by itself.

The circuit board 181 is electrically connected to antennas ANT1 to ANT6 and is configured to process radio signals (or, radio electromagnetic waves) transceived via the antennas ANT1 to ANT6. For the processing of radio signals, a plurality of transmission/reception (Tx/Rx) circuits 182 may be formed or installed in the circuit board 181.

The Tx/Rx circuits may be configured by including at least one integrated circuit and relevant electrical elements. For example, a Tx/Rx circuit may include a Tx integrated circuit, an Rx integrated circuit, a switching circuit, an amplifier, etc.

A plurality of the Tx/Rx circuits simultaneously feed the conductive members that are radiators, whereby a plurality of the antennas ANT1 to ANT6 can operate simultaneously. For example, while one performs a transmission, the other can perform reception. Both may perform transmission or reception.

A plurality of Tx/Rx circuits can be configured. Each of the Tx/Rx circuits can be implemented as a communication chip including at least one of a call processor (CP), a modem chip, an RF transceiver chip, and an RF receiver chip. Thus, each communication chip may transmit a radio signal by feeding the conductive member through a feeder unit and a matching module (variable switch 135 included), or perform a prescribed reception processing such as a frequency transform processing, a demodulation process and the like by receiving an Rx radio signal received by the conductive member through the matching module (variable switch 135 included) and the feeder unit.

According to a related art, radiation is performed by a conductive pattern provided within a terminal body, whereby a radiation region can be secured easily. In order to maximize a radiation space of a conductive member, a separate additional antenna pattern is required, which means that a size of a basic antenna should increase.

Hence, in case of using a metallic member forming an exterior of the mobile terminal 100, e.g., the side portion 102a forming a lateral side of the mobile terminal 100 as a radiator of an antenna, securing a radiation space (open space) is limited unless an antenna pattern is added. This shall be described with reference to FIG. 4A and FIG. 4B.

Figure 4A:
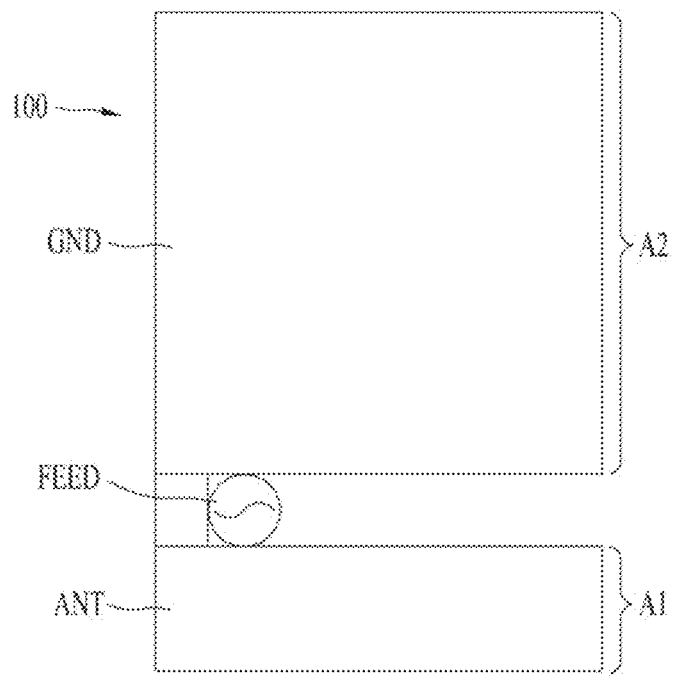
FIG. 4A is a conceptual diagram of a comparison example of a slot antenna.
Figure 4B:
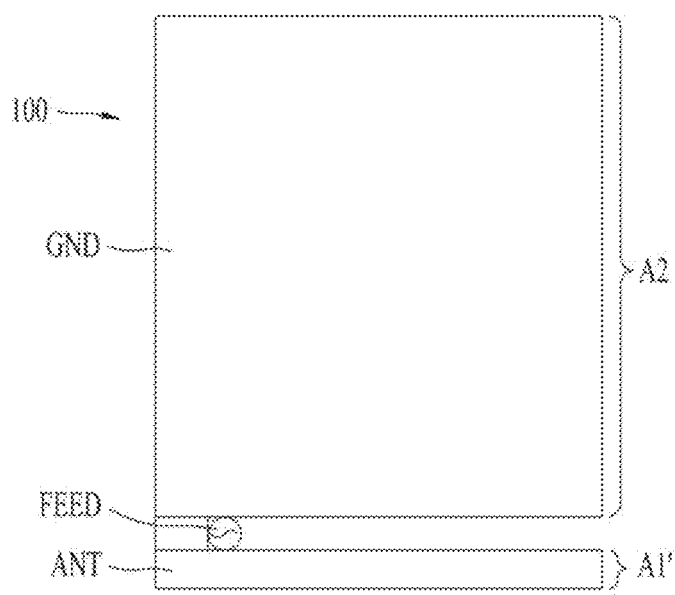
FIG. 4B is a conceptual diagram of a slot antenna related to one embodiment of the present invention.

FIG. 4A is a conceptual diagram of a comparison example of a slot antenna, and FIG. 4B is a conceptual diagram of a slot antenna related to one embodiment of the present invention. Referring to FIG. 4A and FIG. 4B, a size of a first radiation region A1 in FIG. 4A is greater than a first radiation region A1' in FIG. 4B. A size of a second radiation region A2 in FIG. 4A is equal to that of a second radiation region A2 in FIG. 4B. Here, the first radiation region A1/A1' means a radiation region by an antenna pattern (conductive pattern) and the second radiation region A2 means a radiation region abandoned to a ground GND.

In FIG. 4A, as the first radiation region A1 by an antenna ANT is sufficiently secured, dependency of radiation by the first radiation region A1 is high. Yet, in FIG. 4B, since the first radiation region A1' is not secured sufficiently, it is necessary to induce radiation of the second radiation region A2 due to radiation performance degradation of an antenna ANT. Namely, according to one embodiment of the present invention, a technique of utilizing a part utilized as a ground GND as a portion of an antenna radiator is provided. Yet, in one embodiment of the present invention, it may not mean that radiation should be performed on a ground.

Thus, as a ground GN is extended to a radiation space of an antenna pattern, a radiation region can be extended and radiation performance in a size of a given ground can be maximized.

Figure 3:
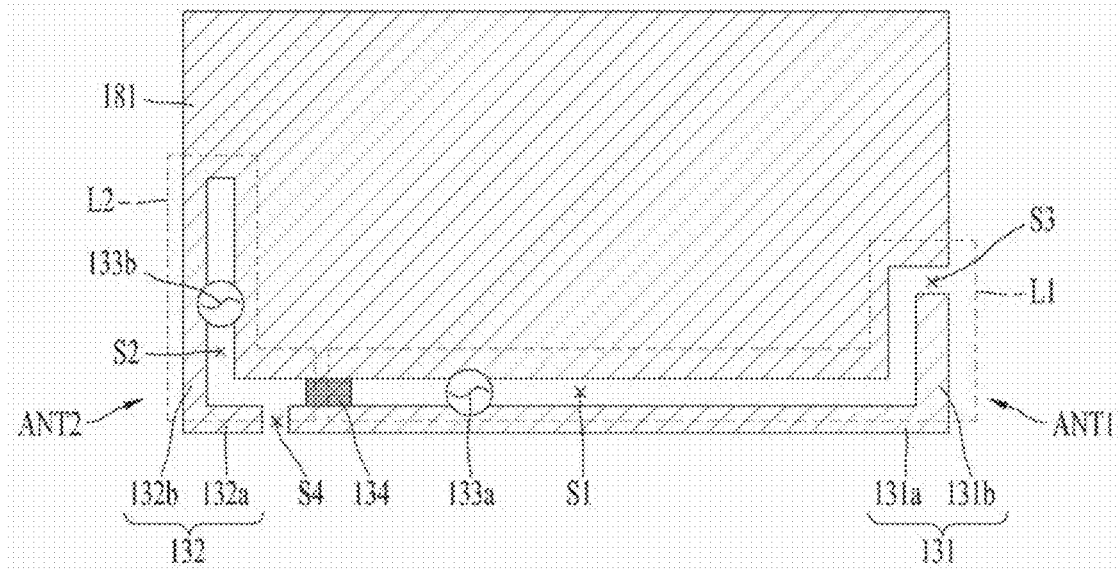
FIG. 3 is a conceptual diagram of a mobile terminal to describe an antenna device according to one embodiment of the present invention.
Figure 5A:
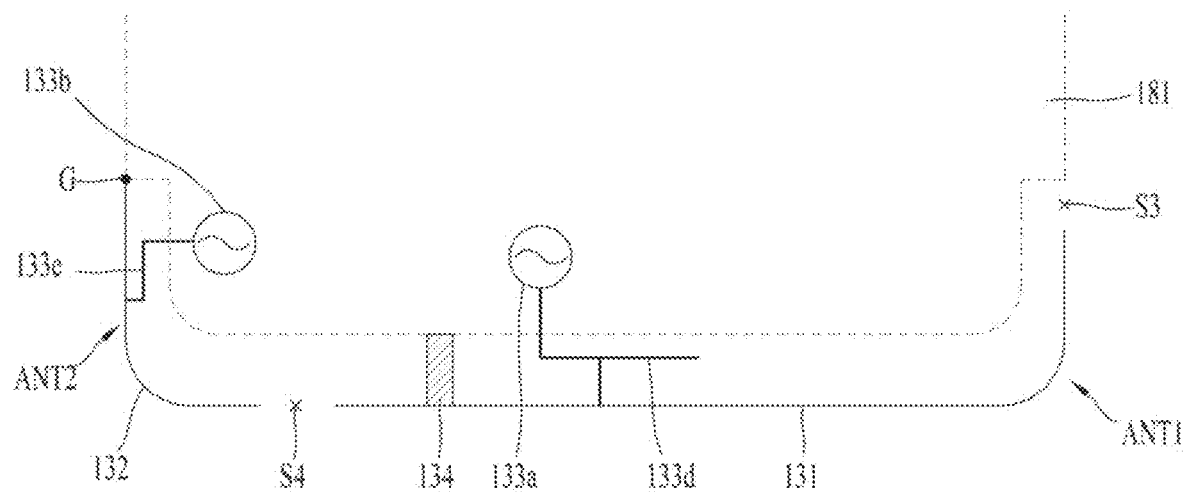
FIG. 5A and FIG. 5C are diagrams to describe a bottom antenna according to one embodiment of the present invention.

Meanwhile, FIG. 3 is a conceptual diagram of a mobile terminal to describe antenna devices ANT1 and ANT2 according to one embodiment of the present invention and FIG. 5A is a conceptual diagram of an antenna device according to one embodiment of the present invention. The following description shall be made with reference to FIG. 3 and FIG. 5A together.

According to one embodiment of the present invention, the conductive members 131 and 132 spaced part from the ground provided within the terminal body form slots so as to form slot antennas. Here, the ground may include one of the printed circuit board 181, the middle frame 185 (cf. FIG. 2A) and the rear cover 103 covering a rear side of the terminal body. The following description shall be made by focusing on that the printed circuit board 181 performs a function of a ground.

The mobile terminal 100 according to one embodiment of the present invention includes a first conductive member 131 forming a first slot S1 by being spaced apart from the ground 181 and a second conductive member 132 forming a second slot S2 by being spaced apart from the ground 181. The first conductive member 131 and the second conductive member 132 are formed in a direction of crossing with each other approximately. For example, if the first conductive member 131 is formed in a width direction of the mobile terminal 100, the second conductive member 132 may be formed along a length direction of the mobile terminal 100. Yet, the first conductive member 131 may not mean as formed in a first direction only and the second conductive member 132 may not mean as formed in a second direction only. Instead, it is enough for a first loop L1, which is a flow of current formed by the first conductive member 131, and a second loop L2, which is a flow of current formed by the second conductive member 132, not to interfere with each other. Preferably, it is enough for the first and second loops L1 and L2 to be formed in a crossing direction.

In the following description, a direction faced by most of the first conductive member 131 shall be called a first direction and a direction faced by most of the second conductive member 132 shall be called a second direction.

Referring to FIG. 3, the first conductive member 131 includes a first submember 131a formed along the first direction and a second submember 131b formed along the second direction, and the second conductive member 132 includes a third submember 132a formed along the first direction and a fourth submember 132b formed along the second direction. Here, a length of the first submember 131a is greater than that of the second submember 131b, and a length of the third submember 132a is smaller than that of the fourth submember 132b, by which the present invention is non-limited. Namely, a first open slot S3 is formed between the first conductive member 131 and the ground 181 and a second open slot S4 is formed between the first conductive member 131 and the second conductive member 132. Locations of the first and second open slots S3 and S4 are variable according to a resonant frequency to implement.

The first conductive member 131 and the second conductive member 132 may include a first antenna ANT1 and a second antenna ANT2 implementing different resonant frequency bands, respectively. A first resonant frequency band is implemented by the first antenna ANT1, and a second resonant frequency band different from the first resonant frequency band is implemented by the second antenna ANT2.

A first feeder unit 133a feeding the first conductive member 131 is connected to the printed circuit board 181, and a second feeder unit 133b feeding the second conductive member 132 is connected to the printed circuit board 181 as well. A junction portion 134 connected to the ground 181 is formed at one point of the first conductive member 131, thereby performing a function of a ground portion of the first antenna ANT1. The junction portion 134 may be formed of a metallic member having a predetermined size or a multitude of fine cables and perform a function of grounding the first conductive member 131 by electrically connecting the ground 181 and the first conductive member 131 together and a function of separating the first antenna ANT1 and the second antenna ANT2 from each other.

Namely, the first antenna ANT1 and the second antenna ANT2 are distinguished from each other with reference to the junction portion 134.

One end portion of the first conductive member 131 forms the first open slot S3 by being spaced apart from the ground 181, one end portion of the second conductive member 132 forms the second open slot S4 by being spaced apart from one end portion of the first conductive member 131, and the other end portion is connected to the ground 181. Here, the second open slot S4 may include a slot for an ear jack that is the audio output unit 152.

Figure 9A:
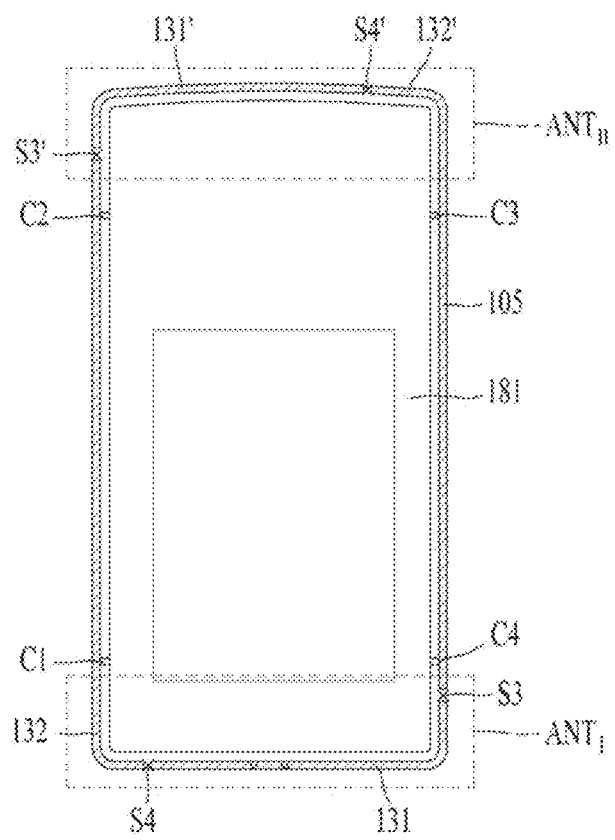
FIG. 9A is a diagram schematically showing a conductive member operating as an antenna of a mobile terminal corresponding to FIG. 2A.

Each of the first and second conductive members 131 and 132 plays a role as an antenna. To a point G at which the second conductive member 132 is connected to the ground 181, the second 132 may be directly connected to the ground 181. Moreover, as contact pins C1 to C4 shown in FIG. 9A are formed, the second conductive member 132 can be grounded to the ground 181. At one or more points in the side part of the mobile terminal 100 except the first to fourth conductive members 131, 132, 131' and 132', at least one contact pin C1 to C4 coming into contact with the ground 181 can be formed.

This applies to a second embodiment of the present invention as well. Namely, although not shown in detail in FIG. 9B, a multitude of contact pins C1 to C4 connected to the ground can be formed on the side part of the case 103. Moreover, contact pins C1 to C4 may be formed on a rear part of the case 103 covering the printed circuit board 181.

Figure 6A:
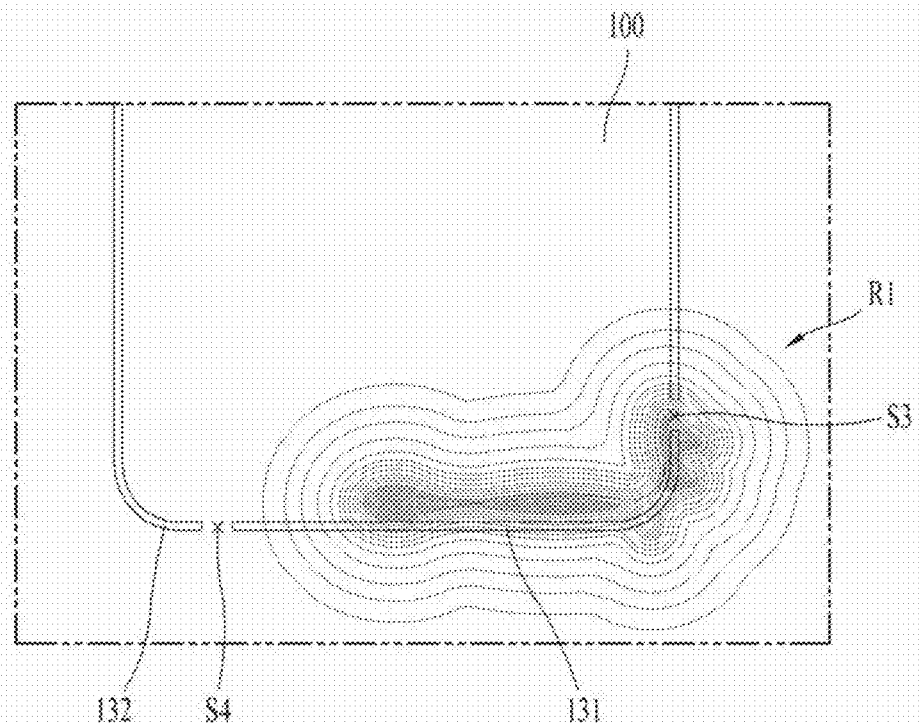
FIG. 6A schematically shows a radiation pattern by a first conductive member according to one embodiment of the present invention, and FIG. 6B schematically shows a radiation pattern by a second conductive member according to one embodiment of the present invention.
Figure 6B:
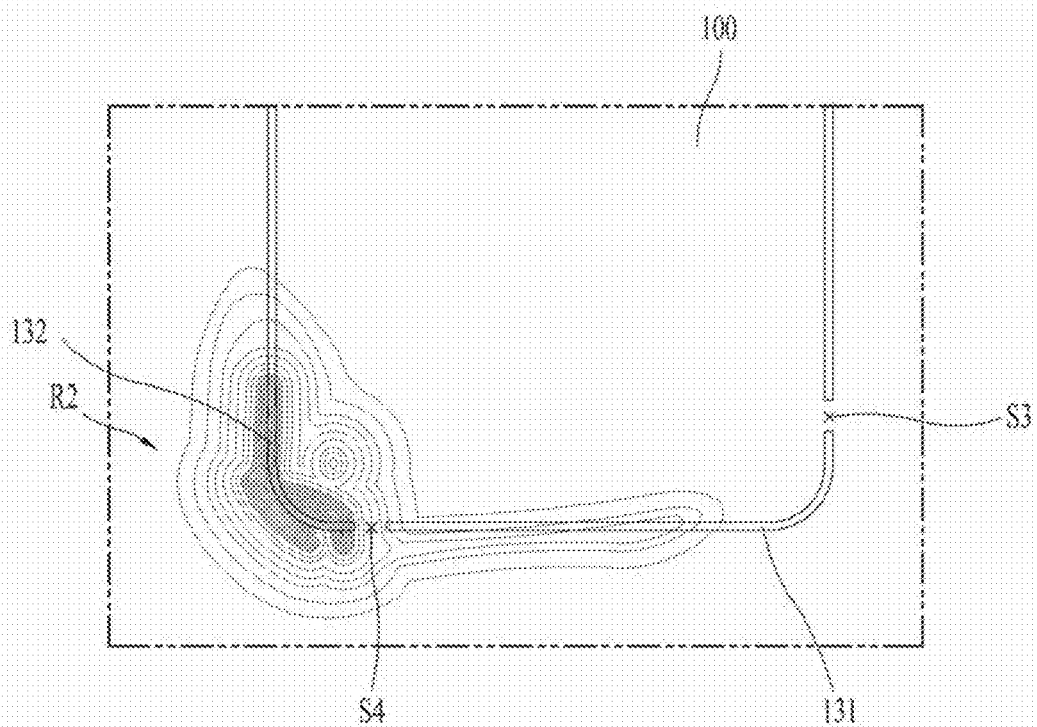

FIG. 6A schematically shows a radiation pattern by a first conductive member 131 according to one embodiment of the present invention, and FIG. 6B schematically shows a radiation pattern by a second conductive member 132 according to one embodiment of the present invention. FIG. 8 schematically shows a radiation pattern by a first conductive member 131 according to a first embodiment of the present invention for a mobile terminal 100 overall.

Referring to FIG. 6A and FIG. 6B, a radiation region R1 by the first conductive member 131 is mainly formed in a right bottom end of the mobile terminal 100 and a radiation region R2 by the second conductive member 132 is mainly formed in a left bottom end of the mobile terminal 100. Hence, it can be observed that the regions R1 and R2 do not interfere with each other. A radiation pattern by the first conductive member 131 is mainly formed along a first direction and a radiation pattern by the second conductive member 132 is mainly formed along a second direction. Hence, it can be observed that the radiation patterns by the first and second conductive members 131 and 132 secure the radiation regions independently without causing considerable effects to each other.

Moreover, according to one embodiment of the present invention, each of the first and second conductive members 131 and 132 is formed in shape of 'L'. Hence, an electric field is induced to be maximized around a corner of the mobile terminal 100, whereby a wider radiation region can be secured. For example, ground radiation can be maximized. In particular, for the implementation of a resonant frequency of a low band in the frequency band implemented in the mobile terminal 100 in general, the mobile terminal 100 is formed to have a wavelength equal to or greater than a wavelength corresponding to the resonant frequency of the low band. Like one embodiment of the present invention, in case of a slot antenna, a length in a length direction of the mobile terminal 100 is formed greater than ¼ of a wavelength λ corresponding to a center frequency of a low band. In this case, in order to complement that radiation performance is weakened due to the shortage of the radiation region by the first conductive member 131, according to one embodiment of the present invention, ground radiation is actively performed. Namely, the electric field in each of the first and second conductive members 131 and 132 is maximized around a corner of the mobile terminal 100.

Moreover, according to one embodiment of the present invention, frequencies of low and high bands are implemented by the first conducive member 131, and a frequency of a middle band is implemented by the second conductive member 132. In order to implement the frequency of the low band, as described above, an electric field distribution by the first conductive member 131 is maximized around the corner. According to one embodiment of the present invention, as shown in FIG. 8, ground radiation is performed around a top side R12 as well as around a bottom side R11. To this end, according to one embodiment of the present invention, each of the first and second open slots S3 and S4 is formed around a corner of the mobile terminal 100. This uses an effect that an electric field is intensively distributed near an open slot.

Yet, since the second conductive member 132 implements a frequency of a middle band, in order to implement a middle band frequency band, ground radiation does not need to be generated from a top side of the mobile terminal 100.

Meanwhile, according to one embodiment of the present invention, it is able to adjust a location of a part at which the first conductive member 131 and the junction portion 134 are connected to each other. And, it is able to add a frequency band to implement by further forming an additional feeder unit the first conductive member 131. For example, FIG. 5C is a diagram to describe a third antenna (ANT3) device according to one embodiment of the present invention, which shows that a third supply unit 133c is added to FIG. 5A. Yet, in this case, the location at which the junction portion 134 is connected to the first conductive member 131 may fluctuate.

As described above, since the junction portion 134 plays a role in distinguishing antennas by the first and second conductive members 131 and 132 and also plays a role as a ground portion in the first conductive member 131, a portion of the first conductive member 131 operates as the first antenna ANT1 and the rest of the first conductive member 131 may operate as the third antenna ANT3. To this end, as shown in FIG. 5C, a third feeder unit 133c can be provided to an opposite side of a location of the first conductive member 131 at which the first feeder unit 133a is formed by being connected to the printed circuit board 181. Namely, the junction portion 134 is formed between a point P3 at which the first feeder unit 133a is connected to the first conductive member 131 and a point P4 at which the third feeder unit 133c is connected to the first conductive member 131.

Here, junction portion 134 may play a role as a ground portion of the third antenna ANT3 formed by the first conductive member 131 and the third feeder unit 133c. Namely, a radiator of the first antenna ANT1 includes a part ranging from a point of the first conductive member 131 having the junction portion 134 connected thereto to the first open slot S3 via a point having the first feeder unit 133a connected thereto, a radiator of the second antenna ANT2 includes the second conductive member 132, and a radiator of the third antenna ANT3 includes a part ranging from a point of the first conductive member 131 having the junction portion 134 connected thereto to the second open slot S4 via a point having the third feeder unit 133c connected thereto, i.e., to an end portion opposing the second conductive member 132.

The antennas formed in the bottom end portion of the mobile terminal 100 are mainly described in the above description, by which one embodiment of the present invention is non-limited. And, antennas implementing a multitude of frequency bands may be formed in a top end of the mobile terminal 100 in the same manner.

Figure 5B:
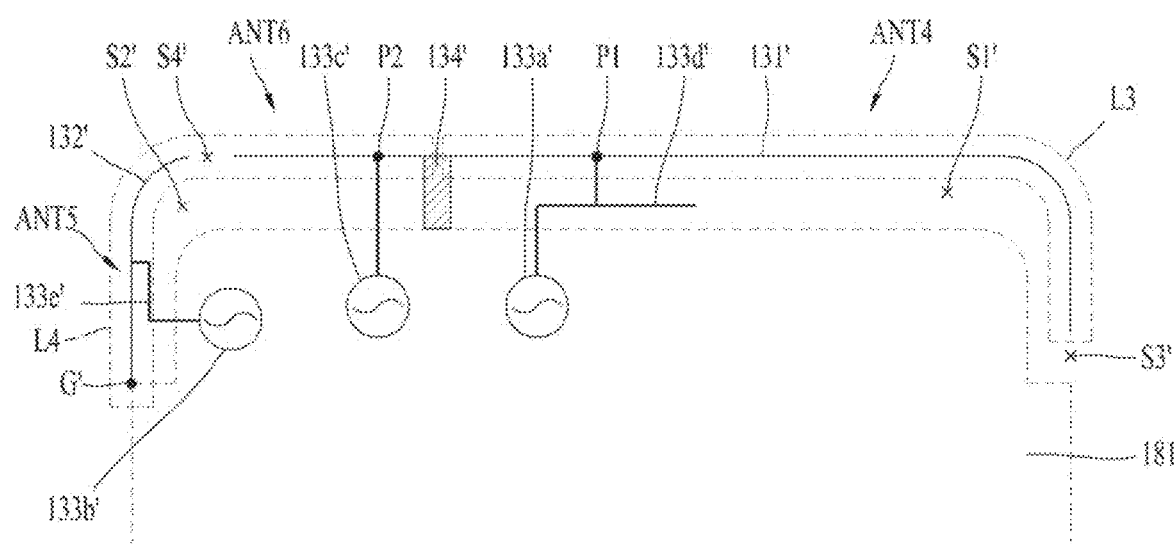
FIG. 5B is a diagram to describe a top antenna according to one embodiment of the present invention.
Figure 5C:
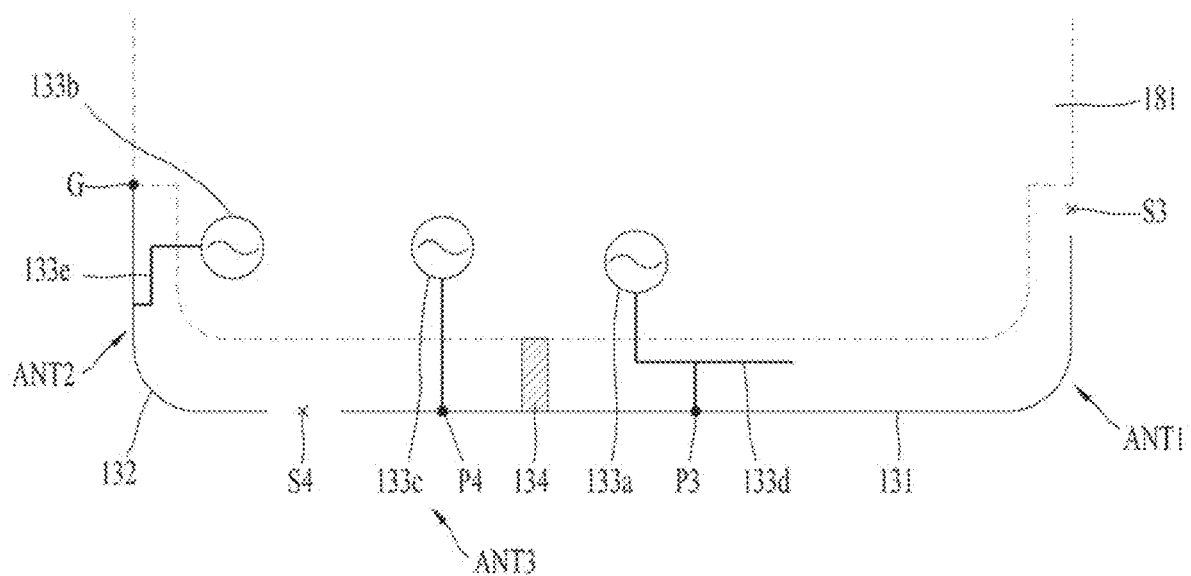

Namely, FIG. 5B is a diagram to describe a top antenna according to one embodiment of the present invention, which is formed in a manner similar to that shown in FIG. 5C.

Antennas ANT 4 to ANT6 formed in the top end of the mobile terminal 100 shall be described with reference to FIG. 5B as follows.

Referring to FIG. 5B, third and fourth conductive members 131' and 132' are formed by being spaced apart in a predetermined distance from the printed circuit board 181 playing a role as a ground. A junction portion 134' is connected to the third conductive member 131'. Fourth and fifth feeder units 133a' and 133b' are provided to the third and fourth conductive members 131' and 132', thereby forming fourth and fifth antennas ANT4 and ANT5, respectively. Moreover, a sixth feeder unit 133c' is formed at a prescribed point of the third conductive member 131' on the opposite side of the fourth feeder unit 133a', thereby implementing a sixth antenna ANT6. Here, third and fourth loops L3 and L4 are formed by the third and fourth conductive members 131' and 132', respectively.

As the fourth to sixth antennas ANT4 to ANT6 formed on the top side of the mobile terminal 100 are configured in the same manner of the first to third antennas ANT1 to ANT3, details shall be omitted from the following description.

Meanwhile, according to one embodiment of the present invention, feeder extension portions 133d, 133d', 133e and 133e' can be formed in at least one of the first to sixth feeder units 133a, 133a', 133b, 133b', 133c and 133c' ranging from the printed circuit board 181 to the first to the first to fourth conductive members 131, 131', 132 and 132'. The feeder extension portions 133d, 133d', 133e and 133e' are elements for impedance matching.

Figure 7:
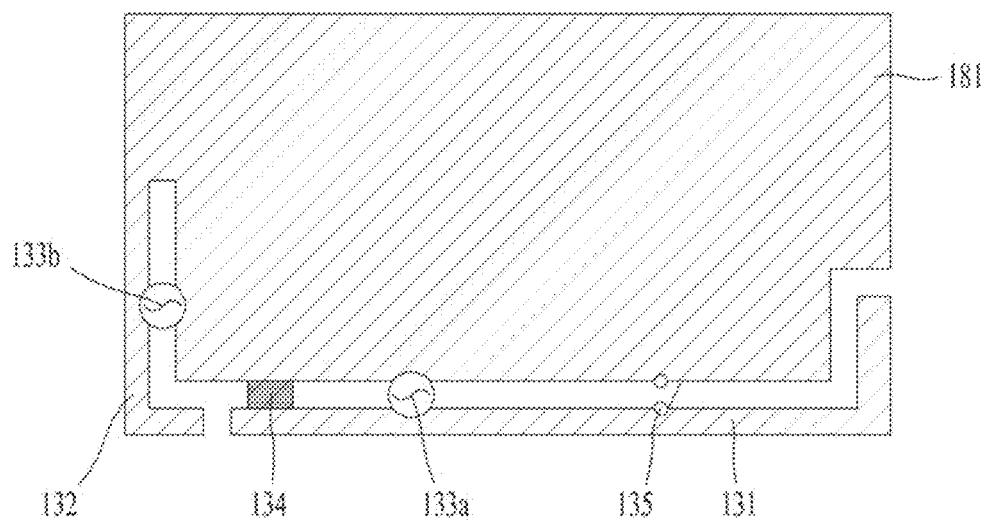
FIG. 7 is a diagram to describe that a switch is formed on an antenna of a mobile terminal according to one embodiment of the present invention.

FIG. 7 is a diagram to describe that a switch 135 is formed on an antenna of a mobile terminal 100 according to one embodiment of the present invention. Referring to FIG. 7, a switch 135 can be formed to connect the ground 191 to a prescribed point of the first conductive member 131 or the second conductive member 132. The switch 135 may be an element for varying a resonant frequency, named a matching module or a matching unit for impedance matching, and formed in the first or second slot S1 or S2.

The switch 135 can be configured by various combinations of capacitors and inductors. For example, the switch 135 may include inductors differing in size, both an inductor and a capacitor, or a single inductor only. Moreover, an inductor and a variable capacitor may be connected together in series, a variable capacitor may be provided, or an indictor and a variable capacitor may be connected in parallel.

The above examples are provided exemplarily. A variable inductor is usable. A 2-contact point switch 135 (SPDT, Single Pole Double Throw) and a 3-contact point switch 135 (SP3T, Single Pole Triple Throw) are available as well. Here, if an inductor is used, a resonant frequency can be lowered. If a capacitor is used, a resonant frequency can be raised. By the appropriate combination of them, it is able to vary a resonant frequency. Such a variable switch 135 is apparent to those skilled in the art and its details shall be omitted from the following description.

How to implement the aforementioned first to fourth conductive members 131, 131', 132 and 132' or the aforementioned first to sixth antennas ANT1 to ANT6 in the mobile terminal 100 shall be described as follows.

FIG. 2A is an exploded perspective diagram of the mobile terminal 100 according to the first embodiment of the present invention, and FIG. 9A is a diagram schematically showing a conductive member operating as an antenna of the mobile terminal 100 corresponding to FIG. 2A. referring to FIG. 2A and FIG. 9A, the first to fourth conductive members 131, 131', 132 and 132' form the side portion 102a of the mobile terminal 100 and are exposed externally. The first and second open slots S3 and S4 are formed in the first and second conductive members 131 and 132, respectively. The third and fourth open slots S3' and S4' are formed in the third and fourth conductive members 131' and 132', respectively. Feeder units are not shown in FIG. 9A, which applied to FIG. 9B. Here, the first to third antennas ANT1 to ANT3 configure a bottom antenna ANTI, and the fourth to sixth antennas ANT4 to ANT6 configure a top antenna ANTII.

According to a first embodiment of the present invention, the side portion 102a including the first and second conductive members 131 and 132 is formed of a metal member, some of the side portion 102a operates as an antenna, and the rear cover 103 is formed of a nonmetallic member. Moreover, the feeder extension portion 133d failing to be shown in detail or a conductive pattern (not shown) may be additionally formed on one surface of the rear case 102.

As the first embodiment of the present invention utilizes a portion of a metallic member forming a side of the mobile terminal 100 as an antenna, it can be called a metal ring structure.

On the other hand, like the first embodiment, the second embodiment of the present invention also utilizes a portion of a metallic member forming a side of the mobile terminal 100 as an antenna. Yet, as the case 103 configured to receive the display unit 151 therein has a single configuration, a part covering a rear side of the case 103 is used as a metal member. Hence, it may be called a metal cover structure.

Figure 9B:
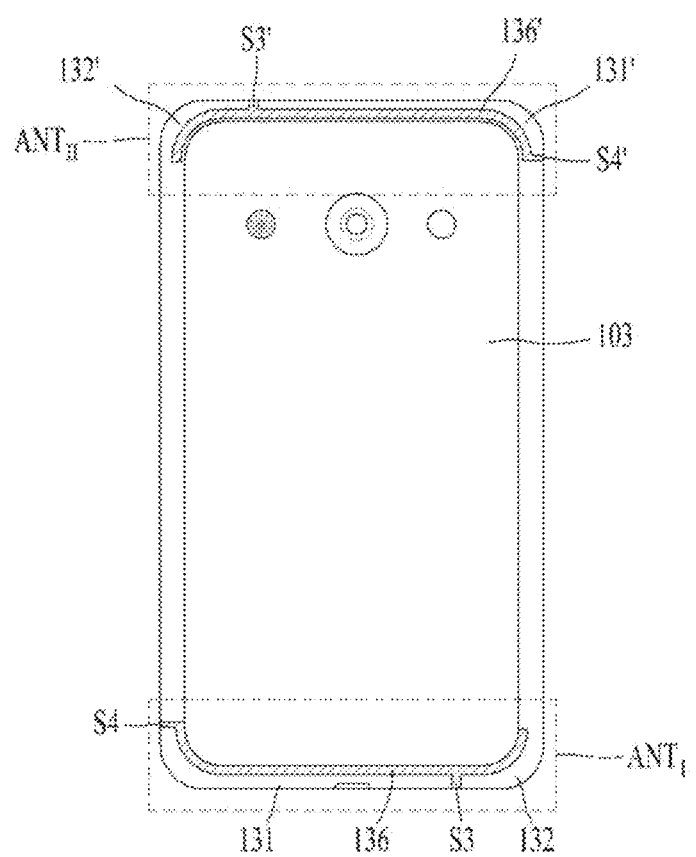
FIG. 9B is a diagram schematically showing a conductive member operating as an antenna of a mobile terminal corresponding to FIG. 2B.

FIG. 2B is an exploded perspective diagram of the mobile terminal 100 according to the second embodiment of the present invention, and FIG. 9B is a diagram schematically showing the rear cover 103 and the conductive member operating as an antenna in the mobile terminal 100 corresponding to FIG. 2B.

The mobile terminal 100 according to the second embodiment of the present invention is a terminal of a uni-body type, and a display unit 151 is received in a single case 103. Here, a rear side of the case 103 can be formed of metallic material. Thus, if a part covering the rear side of the mobile terminal 100 is formed of metallic material, it affects radiation performance by the first to fourth conductive members 131, 131', 132 and 132'. Therefore, according to the second embodiment of the present invention, nonmetallic members 136 and 136' are formed to electrically insulate the first to fourth conductive members 131, 131', 132 and 132' from a rear side part occupying most of the rear side of the mobile terminal 100. For example, the nonmetallic members 136 and 136' may include polycarbonate or any nonmetallic material unless mentioned especially. Moreover, as shown in FIG. 9A, as a multitude of the contact pins C1 to C4 connecting the ground 181 to the side portion 102a are formed, it is able to prevent the side portion 102a except the first to fourth conductive members 131, 131', 132 and 132' from affecting radiation performance of an antenna. Namely, the contact pins C1 to C4 can be formed on a part of the side portion 102a except the first to fourth conductive members 131, 131', 132 and 132'.

Figure 10A:
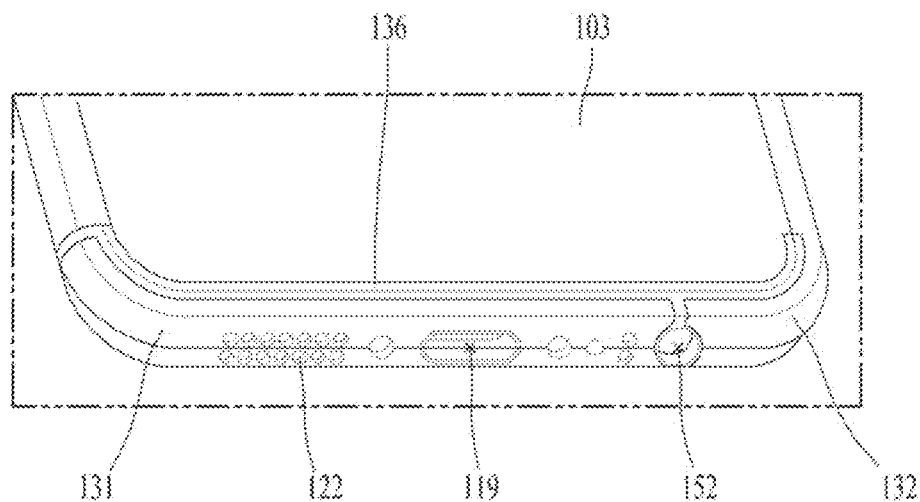
FIG. 10A is a rear perspective diagram of a mobile terminal according to a second embodiment of the present invention.
Figure 10B:
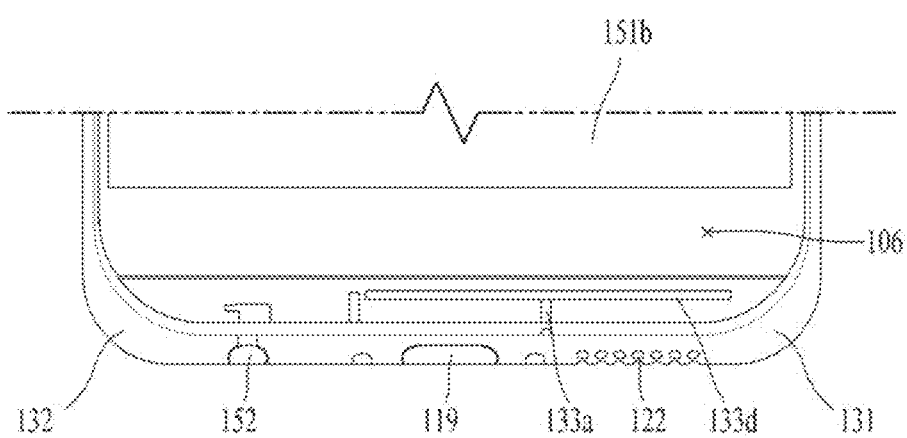
FIG. 10B is a front perspective diagram in a state that a window of a mobile terminal according to a second embodiment of the present invention is removed.
Figure 10C:
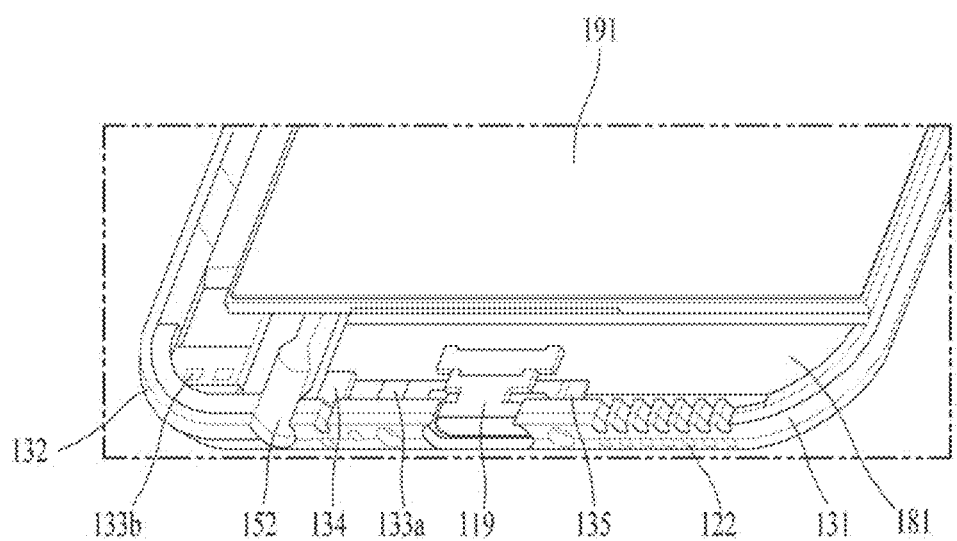
FIG. 10C is a front perspective diagram of a mobile terminal in a state that a display unit in FIG. 10B is removed.

FIG. 10A is a rear perspective diagram of a mobile terminal 100 according to a second embodiment of the present invention, FIG. 10B is a front perspective diagram in a state that a window 151a of the mobile terminal 100 according to the second embodiment of the present invention is removed, and FIG. 10C is a front perspective diagram of the mobile terminal 100 in a state that the display unit 151 is removed in FIG. 10B. Namely, FIG. 10B shows a state that the window 151a is removed from the display unit 151 only and that a display module 151b is installed in a terminal body.

Referring to FIGS. 10A to 10C, since a case 103 that is a metallic member of the mobile terminal 100 according to the second embodiment of the present invention may affect antenna performance, as shown in FIG. 10A, nonmetallic members 136 and 136' are provided so that first and second conductive members 131 and 132 can be electrically insulated from the case 103. A first feeder unit 133a feeding the first conductive member 131 and a feeder extension portion 133d of the first feeder unit 133a are formed near to a front side of the mobile terminal 100. Particularly, the first feeder unit 133a and the feeder extension portion 133d are formed on the printed circuit board 181 so as to extend to a backside of the display unit 151. Yet, it is not mandatory for the first feeder unit 133a and the feeder extension portion 133d to be formed near the front side of the mobile terminal 100. In order to minimize the influence of the case 103, metallic members related to antenna performance are preferably formed by being spaced apart from the case 103.

The above-described present invention can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal. It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Embodiments of the present invention are applicable to a mobile terminal having at least one slot.

What is claimed is:

1. A mobile terminal having four sides and four corners, and comprising:
   a frame comprising a ground portion and conductive members defining externally exposed portions at two or more of the four sides of the mobile terminal, wherein the frame comprises:
   a first conductive member defining at least part of a first corner of the four corners and configured to operate as a radiator of a first antenna and a radiator of a second antenna, wherein the first conductive member comprises:
     a first sub-member positioned at a first short side of the four sides;
     a second sub-member positioned at a first long side of the four sides; and
     a third sub-member positioned at the first short side,
     wherein a single junction portion connects the first conductive member and the ground portion of the frame,
     wherein the first and second sub-members of the first conductive member are fed by a first feeder unit for operating as the radiator of the first antenna,
     wherein the third sub-member of the first conductive member is fed by a third feeder unit for operating as the radiator of the second antenna, and wherein the first sub-member and the third sub-member are positioned opposite each other with respect to a connection point of the first conductive member and the single junction portion;

a second conductive member defining at least part of a second corner of the four corners and configured to operate as a radiator of a third antenna, wherein the second conductive member comprises:

a fourth sub-member positioned at the first short side; and a fifth sub-member positioned at a second long side of the four sides opposite the first long side, wherein the fourth and fifth sub-members are fed by a second feeder unit for operating as the radiator of the third antenna, wherein the first conductive member and the second conductive member are externally exposed, wherein the third sub-member and the fourth sub-member are separated by a first slot positioned at the first short side, and wherein the second sub-member and an adjacent portion of the first long side are separated by a second slot positioned at the first long side, wherein the first conductive member comprises an L-shape corresponding to the first corner, and wherein the first corner corresponds to a corner on a right side or a left side of the mobile terminal.

2. The mobile terminal of claim 1, wherein the first feeder unit and the third feeder unit are positioned opposite each other with respect to the single junction portion.

3. The mobile terminal of claim 1, wherein a total length of the first and third sub-members is longer than a length of the second sub-member.

4. The mobile terminal of claim 1, further comprising a feeder extension portion provided at least the first feeder unit or the third feeder unit.

5. The mobile terminal of claim 1, wherein at least two of the first, second, and third antennas are capable of receiving radio signals simultaneously.

6. A mobile terminal comprising:
a display at a front of the mobile terminal;
a body having four sides and four corners; and
a frame comprising a ground portion and conductive members defining externally exposed portions at two or more of the four sides of the body;
wherein the frame comprises:
a first conductive member defining at least part of a first corner of the four corners and configured to operate as a radiator of a first antenna and a radiator of a second antenna, wherein the first conductive member comprises:
a first sub-member positioned at an upper side of the four sides;
a second sub-member positioned at a first lateral side of the four sides; and
a third sub-member positioned at the upper side,
wherein a single junction portion connects the first conductive member and the ground portion of the frame,
wherein the first and second sub-members of the first conductive member are fed by a first feeder unit for operating as the radiator of the first antenna,
wherein the third sub-member of the first conductive member is fed by a third feeder unit for operating as the radiator of the second antenna, and
wherein the first sub-member and the third sub-member are positioned opposite each other with respect to a connection point of the first conductive member and the single junction portion;

a second conductive member defining at least part of a second corner of the four corners and configured to operate as a radiator of a third antenna, wherein the second conductive member comprises:

a fourth sub-member positioned at the upper side; and a fifth sub-member positioned at a second lateral side of the four sides opposite the first lateral side, wherein the fourth and fifth sub-members are fed by a second feeder unit for operating as the radiator of the third antenna, wherein the first conductive member and the second conductive member are externally exposed, wherein the third sub-member and the fourth sub-member are separated by a first slot positioned at the upper side, and wherein the second sub-member and an adjacent portion of the first lateral side are separated by a second slot positioned at the first lateral side, wherein the first conductive member comprises an L-shape corresponding to the first corner, and wherein the first corner corresponds to a corner on a right side a left side of the mobile terminal.

7. The mobile terminal of claim 6, wherein the first feeder unit and the third feeder unit are positioned opposite each other with respect to the single junction portion.

8. The mobile terminal of claim 6, wherein a total length of the first and third sub-members is longer than a length of the second sub-member.

9. The mobile terminal of claim 6, further comprising a feeder extension portion provided at least the first feeder unit or the third feeder unit.

10. The mobile terminal of claim 6, wherein at least two of the first, second, and third antennas are capable of receiving radio signals simultaneously.

* * * * *